United States Patent [19]
Fournier et al.

[11] Patent Number: 4,703,784
[45] Date of Patent: Nov. 3, 1987

[54] DUAL OPERATION TANK FILLING FITTING WITH AUTOMATIC SHUT-OFF

[75] Inventors: Paul J. E. Fournier, Jackson; Joseph F. Reinker, Jr., Parma, both of Mich.

[73] Assignee: Aeroquip Corporation, Jackson, Mich.

[21] Appl. No.: 853,931

[22] Filed: Apr. 21, 1986

Related U.S. Application Data

[62] Division of Ser. No. 591,257, Mar. 19, 1984, Pat. No. 4,611,618.

[51] Int. Cl.⁴ .......................... F16K 31/18; B65B 3/26
[52] U.S. Cl. ..................................... 141/198; 141/113; 141/348; 137/415
[58] Field of Search ................. 137/414, 415; 141/113, 141/383, 348, 192, 198, 351, 95

[56] References Cited

U.S. PATENT DOCUMENTS

| 1,679,309 | 7/1928 | Justus | 137/415 |
| 2,491,521 | 12/1949 | Samiran | 137/414 |
| 2,556,221 | 6/1951 | Samiran | 141/348 X |
| 2,623,726 | 12/1952 | Suska | 137/414 |
| 2,649,109 | 8/1953 | Samiran | 141/346 X |
| 2,698,631 | 1/1955 | Bashark | 137/414 |
| 2,712,828 | 7/1955 | Badger, Jr. | 137/414 |
| 2,726,674 | 12/1955 | Davies | 137/414 X |
| 2,811,167 | 10/1957 | Bott | 137/414 |
| 2,849,019 | 8/1958 | Oliveau et al. | 137/414 X |
| 2,923,314 | 2/1960 | Badger, Jr. et al. | 137/414 |
| 3,029,833 | 4/1962 | DeFrees | 137/414 |
| 3,058,485 | 10/1962 | McQueen | 137/414 X |
| 3,062,246 | 11/1962 | Koehler | 137/414 X |
| 3,145,729 | 8/1964 | Cordis | 137/414 |
| 3,473,886 | 10/1969 | Leeds | 141/348 |
| 4,040,456 | 8/1977 | DeFrees | 141/349 |
| 4,611,618 | 9/1986 | Fournier et al. | 137/68.1 |

FOREIGN PATENT DOCUMENTS

| 2311239 | 1/1977 | France | 137/414 |
| 845284 | 8/1960 | United Kingdom | 137/415 |

Primary Examiner—Stephen Marcus
Assistant Examiner—Ernest G. Cusick
Attorney, Agent, or Firm—Beaman & Beaman

[57] ABSTRACT

A self-contained tank filling fitting having dual operation wherein the fitting may be used with a gravity fluid supply system or a pressurized fluid supply system. The fitting includes an elbow having an upper end closed by a removable cap, and a pressurized filling port located in the bend of the elbow aligns with a tank port to reduce resistance to pressurized fluid filling. An automatic differential pressure valve controlled by a float operated vent automatically closes the pressurized filling port upon the tank being filled.

3 Claims, 9 Drawing Figures

DUAL OPERATION TANK FILLING FITTING WITH AUTOMATIC SHUT-OFF

This is a division of application Ser. No. 591,257 filed Mar. 19, 1984, now U.S. Pat. No. 4,611,618 issued Sept. 16, 1986.

BACKGROUND OF THE INVENTION

Frangible fluid fittings and couplings are commonly employed in the fuel lines of aircraft. The purpose of such fittings is to minimize the escape of fuel during crashes, and such crash-worthy fittings and couplings are often employed to connect the several fuel tanks commonly used in aircraft of many types.

Crash-worthy fittings normally use a spring biasd self-closing valve which is held in the open position by a detent or stop which senses the presence of other fitting components. Upon the fitting being subjected to excessive forces, the fitting will fracture and portions thereof separate permitting the detent to be released that the valve may close.

A disadvantage with known crash-worthy fittings and couplings results from the typical construction wherein the detent is located at only one position on the fitting. Thus, as the direction of forces on the fitting and the nature of relative component movement cannot be predicted during a crash, it is possible that only partial separation of the fitting components may occur, and if such partial separation results at a location of the fitting as does not produce detent movement the valve will remain in the open position even though fluid is escaping through other portions of the fractured fitting. Conventional crash-worthy fittings can only insure 100% operation if the components sensed by the detent fully separate, which does not necessarily occur during each impact.

It is an object of the invention to provide a frangible fluid fitting which releases the self-closing valve upon the occurrence of minor fracturing and relative part movement, and regardless of the direction or location of the fracture with respect to the valve retaining detent.

Another object of the invention is to provide a crash-worthy fluid fitting which is of economical construction, yet is more dependable and sensitive in operation than prior crash-worthy fitting constructions.

An additional object of the invention is to provide a crash-worthy fuel intake fitting of the gravity type which permits fuel tanks to be filled to capacity.

An additional object of the invention is to provide a fuel tank fitting which permits tanks to be filled either by gravity or pressurized supply systems, and wherein the tanks may be filled to the maximum, and when using the pressurized supply, a flow control valve is automatically closed upon the tank filling.

In the practice of the invention two primary components of a fitting or coupling are interconnected by frangible means, such as pins, bolts, screws, weak cross sections, etc. The interconnection components may consist of the halves or primary parts of a coupling, or may consist of a fitting mounting plate attached to the tank and an inlet, port, extension or the like attached thereto. A self-closing valve is associated with one or both of the parts, and a detent retains the valve in an open position during normal operation.

At the surface at which the parts are interconnected an annular recess is defined in one part surrounding the flow passage. This recess is filled with hard balls, and the balls are retained within the recess by the attachment surface of the other part. The valve retaining detent engages the balls and is held in the valve open position thereby.

In the event of a crash or impact causing the frangible elements to fracture and permitting the fitting or coupling parts to even partially separate at the attachment surface, the balls are, at least, partially released from the recess, and are no longer sufficiently "compressed" to maintain the valve detent in the open position. The fitting valve closes sealing the fitting against fluid flow.

The use of the balls insures valve operation regardless of the direction of fracture or fitting part separation relative to the flow passage axis. Thus, even though only a single valve retaining detent is employed, the apparatus is sensitive to separation at the attachment surface at any location throughout the full 360°.

One of the crash-worthy fittings in accord with the invention is of the tank-filling type such as used with aircraft, and permits the fuel tank to be fully filled even though the filling port is located on the side of the tank below its uppermost regions. The fitting includes an extension extending even with the top of the tank, and the use of this extension simplifies refueling where a pressure system is not available, and permits maximum tank capacity.

An embodiment of the aforedescribed tank filling and extension fitting includes a port for alternatively permitting pressurized tank filling. The pressurized port includes a differential pressure-operated valve associated with venting means which closes the valve and terminates filling upon the tank capcity being reached.

In the practice of the invention a dependability is achieved for crash-worthy fittings and couplings not heretofore possible, and the objects of the invention have been attained by the inventive concepts.

BRIEF DESCRIPTION OF THE DRAWINGS

The aforementioned objects and advantages of the invention will be appreciated from the following description and accompanying drawings wherein.

BRIEF DESCRIPTION OF THE PREFERRED EMBODIMENTS

Figure 1:
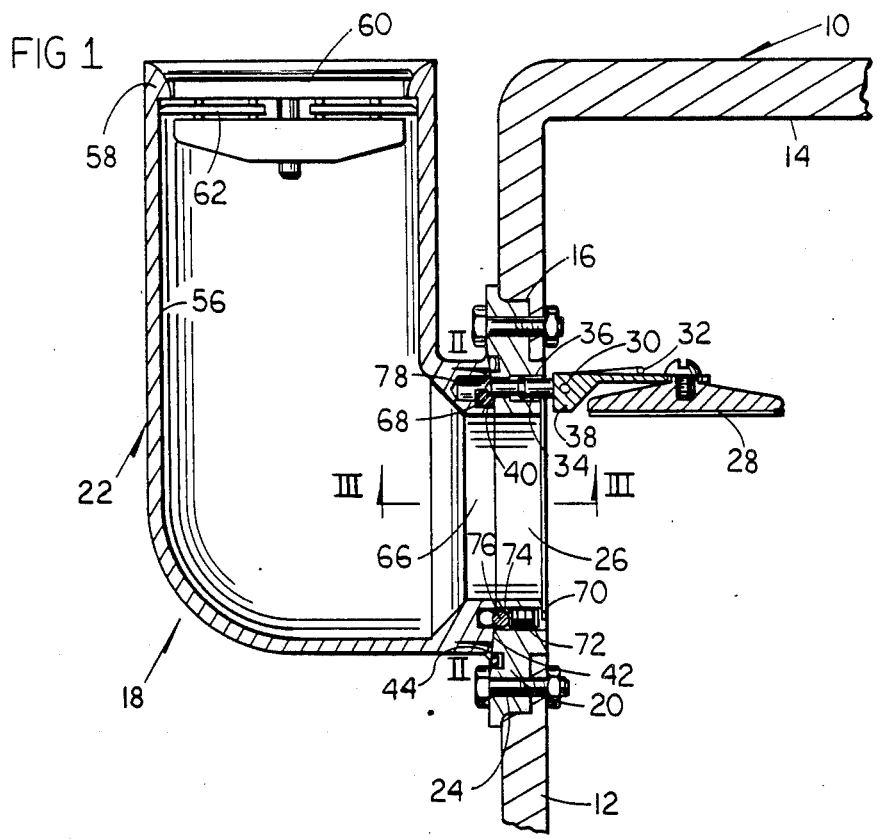
FIG. 1 is an elevational, sectional view of a refueling gravity-type fitting in accord with the inventive concepts, the valve being held in the open position.

In FIG. 1 an embodiment of the invention is illustrated as used with a fitting for filling a fuel tank, such as in a helicopter. In the drawings, the fuel tank is represented at 10 and includes a side wall 12, and an upper wall 14. A vent, not shown, is mounted in the upper wall whereby air may be vented from the tank as it is filled and a float is utilized with the vent to prevent fuel loss. Such venting devices are commonly known.

An opening 16 is defined in the tank side wall for receiving the refueling fitting 18. The fitting consists of an annular circular port plate 20 received within opening 16 having attached thereto the elbow extension 22.

The shouldered port plate 20 is mounted within the tank opening by a plurality of spaced bolts 24, and the port plate includes a flow passage 26 which may be selectively closed by the pivotally mounted valve 28 attached to the inside of the port plate on pivot 30. The torsion spring 32 biases the valve 28 toward the closed condition wherein the valve engages the inner surface of the port plate to close passage 26.

The valve 28 is maintained in the open position illustrated in FIG. 1 by an axially movable detent pin 34 slidably received within the bore 36. The inner end of the detent pin engages the support 38 for the valve, while the outer end 40 of the detent is disposed toward the extension 22. The port plate 20 also includes an attachment surface 42 of an annular configuration which is intersected by the bore 36, the outer end 40 of the detent extending beyond the attachment surface.

The elbow extension 22 includes a horizontally disposed portion having an attachment surface 44 defined thereon engaging the surface 42, and an annular seal 46 produces a fluid-tight connection between the port plate 20 and extension 22. The elbow extension is attached to the port plate by a plurality of circumferentially spaced screws 48, FIG. 3, extending through holes 50 defined in the port plate and threaded into holes 52 formed in the elbow extension. The screws 48 are each provided with a weakened frangible section 54.

The elbow extension 22 includes upwardly extending portion 56 which is provided with a flange 58 whereby a cap 60 may be used to seal the upper open end of the extension portion. The cap 60 uses movable fingers 62 to underlie the flange 58 to hold the cap in place. As will be apparent from FIG. 1, the upper end of the extension 22 is substantially aligned with the tank top wall 14.

Figure 3:
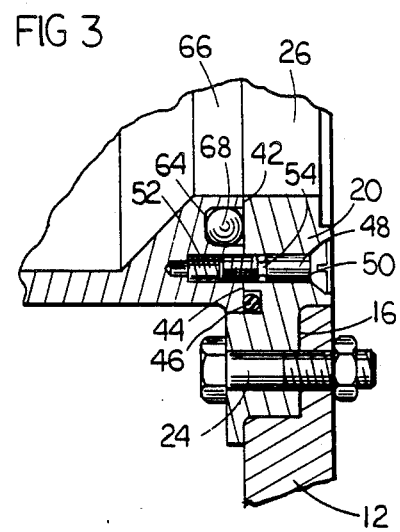
FIG. 3 is an enlarged, elevational, detail sectional view of the attachment surface and frangible fasteners as taken along Section III—III of FIG. 1.

An annular recess 64, FIG. 3, is defined in the elbow extension 22 about the extension's passage 66, and the recess intersects the attachment surface 44. A plurality of balls 68, such as ball bearings, are received with the recess 64, and the recess is completely filled with such balls, and further, the balls are maintained under compression by a plunger generally indicated at 70 which includes a set screw 72 received within the port plate threaded bore 74 tightened against a ball 76 which is in alignment with the "valley" between adjacent balls 68. By tightening set screw 72 the balls within the recess 64, throughout the entire recess configuration, are tightly held against each other.

The outer end 40 of the valve retaining detent pin 34 is received within the recess 64 and engages the balls 68 therein. Thus, the balls prevent movement of the detent 34 to the left. As apparent in FIG. 1, the elbow extension is provided with a clearance 78 in alignment with the detent pin 34 to receive the detent during valve release.

In use, the assembly will be in the condition shown in FIG. 1. The cap 60 will be removed from the extension portion 56, and fuel poured into the extension enters the tank 10. As the upper end of the extension is substantially level with the tank upper wall 14, the tank may be fully filled even though the filling port opening 16 is located well below the upper wall. Upon the tank being filled the cap 60 is applied to the open end in a sealed relationship.

In the event of a crash high impact forces may be imposed upon the extension elbow 22 tending to rip the fitting from the tank. In such event the weakened section 54 of the frangible screws 48 will permit those screws near the greatest tension to fracture at the sections 54, and such fracturing will result in separation of the attachment surfaces 42 and 44. This separation will permit some of the balls 68 to be displaced within or escape from the recess 64, and such movement by the balls will permit the detent 34 to be forced into the recess 64 and clearance 78 by spring 32 permitting the valve 28 to pivot to its closed condition.

As the recess 64, and balls 68, extend 360° about the flow passages 26 and 66, the valve 28 will be closed immediately upon separation in any direction of the attachment surfaces 42 and 44. Thus, by the use of the detent retaining balls 68 only a single detent is required to operate the valve and yet a full 360° sensitivity to fracturing is achieved.

Figure 4:
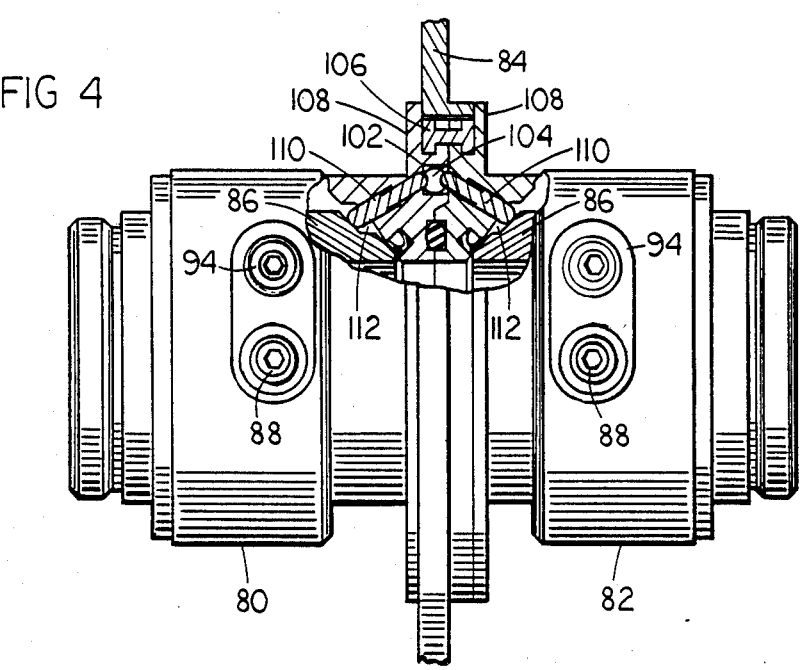
FIG. 4 is a plan view, partially sectioned, illustrating a coupling utilizing the inventive concepts of the invention.
Figure 5:
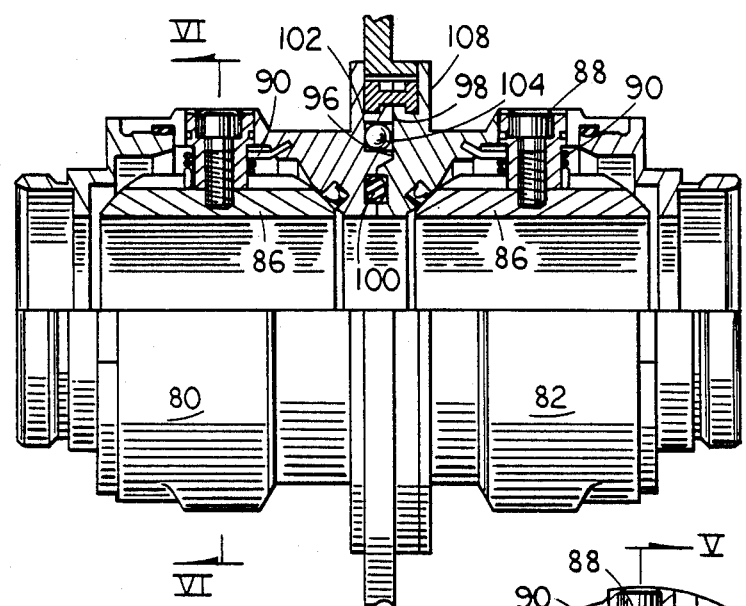
FIG. 5 is an elevational, partially sectioned view of the coupling of FIG. 4 as taken along Section V—V of FIG. 6.
Figure 6:
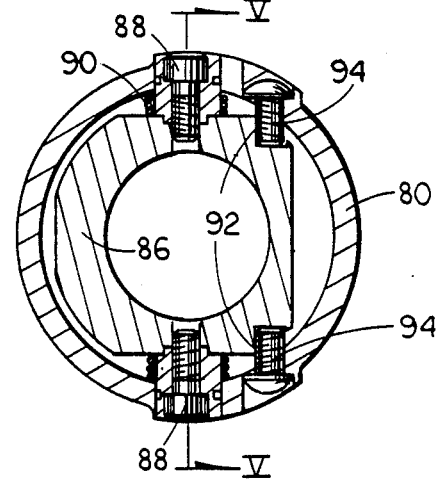
FIG. 6 is an elevational, sectional view as taken along Section VI—VI of FIG. 5.

The aforedescribed inventive concept may also be utilized in a fluid coupling, and FIGS. 4–6 illustrate an example of such use. Coupling parts 80 and 82 are of identical configuration and are associated with hose or pipe, not shown, attached to the portions. In the described embodiment the coupling is mounted within a partition 84, but if desired, the coupling may be free and merely used to interconnect flexible hose line.

Each coupling part includes a passage through which fluid flow is controlled by a rotatable spherical-type valve. The valves 86 pivot upon diametrical opposed pivots 88 and torsion springs 90 bias the valves about the pivot pin axes toward the closed condition. Abutments 92, FIG. 6, defined on the valves cooperate with stop pins 94 to position the valves in the full open position illustrated, and 90° rotation of the valves also causes simular abutment surfaces to engage the pins 94 to terminate rotation of the valves in a closed direction.

The coupling parts engage at attachment surfaces and 96 and 98, which are sealed by the O-ring 100. A recess 102 defined in part 80 intersecting surface 96 is filled with balls 104 engaging attachment surface 98. The coupling parts are maintained in assembled relationship by the frangible H-shaped pins 106 circumscribing the coupling, and the partition 84 is received within the groove defined between flanges 108.

A pair of detent pins 110 are utilized to maintain the valves 86 in the open condition. As apparent in FIG. 4 the pins 110 are each slidably received within a coupling part, and engage shallow recesses 112 defined in the valves when the valves are held in the fully open position illustrated. The outer ends of the detents enter the recess 102 and bear against the balls 104 therein.

In the event of a crash, at least some of the pins 106 may fracture permitting separation of the coupling parts at the attachment surfaces 96 and 98. This separation will release balls 104 from the recess permitting the detents 110 to be forced into the recess 102 by the sides of recesses 112 due to the biasing action imposed on the valves 86 by the valve springs 90. The valves 86 immediately pivot to the closed condition as determined by the stop pins 94.

Figure 2:
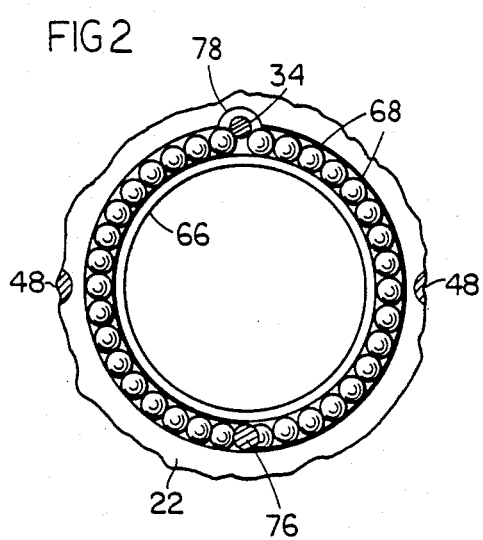
FIG. 2 is an elevational, detail, sectional view taken along Section II—II of FIG. 1.

It will be appreciated from the above that the concept of using the balls to operate the valve detents is adaptable to a coupling as well as to a tank-mounted fitting as shown in FIGS. 1-3.

Figure 7:
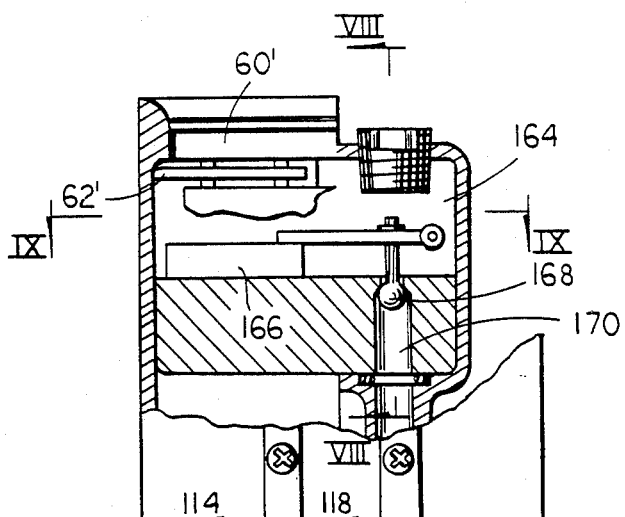
FIG. 7 is an elevational, sectional view of another embodiment of the invention as utilized with a refueling fitting capable of both gravity and pressurized supply.
Figure 8:
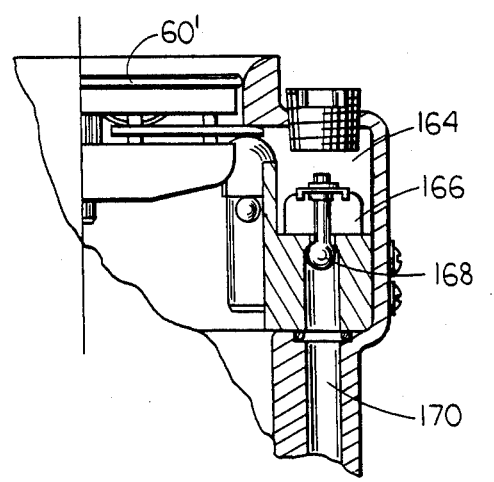
FIG. 8 is a detail, elevational view of the float structure as taken along Section VIII—VIII of FIG. 7.
Figure 9:
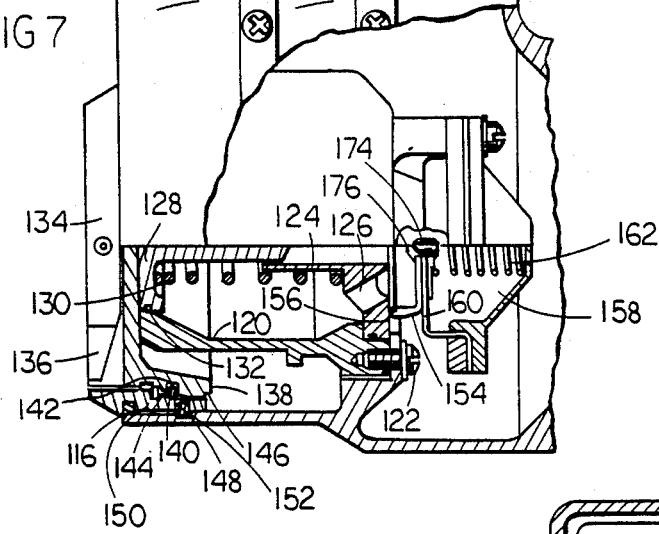
FIG. 9 is a plan sectional view taken along Section IX—IX of FIG. 7.
Figure 9:
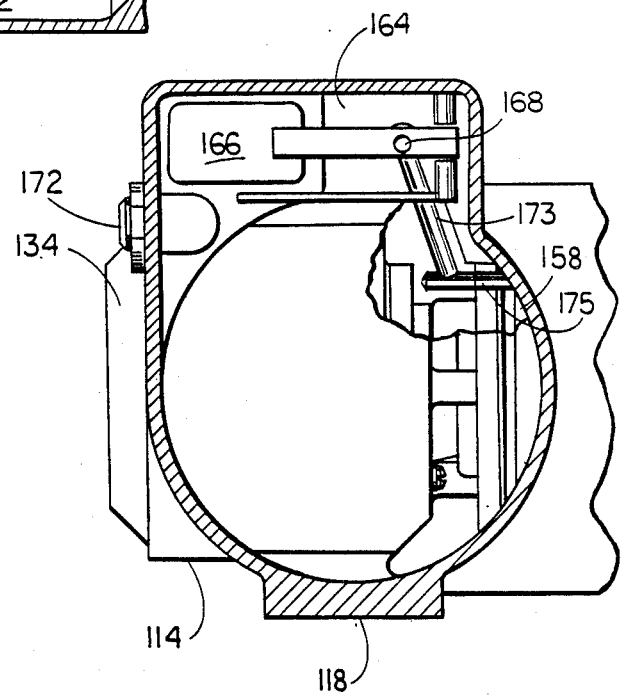

FIGS. 7-9 illustrate a tank-filling fitting similar to that described with respect to FIGS. 1-3, and identical reference numerals are indicated by primes. This fitting is attached to a fuel tank in a manner identical to the previously described embodiment wherein frangible fasteners, balls, and a detent valve retainer is used to close the port plate in the event of a crash.

In this embodiment the elbow extension 114 is provided with a lower attachment portion for attaching the extension to a tank in the manner described above with respect to FIGS. 1-3 and the extension includes a port 116 whereby a pressurized fuel source may be used to fill the associated tank if the same is available. Thus, this embodiment of the invention permits both gravity and pressurized fueling.

Preferably, sight glass 118 is attached to the extension 114, and a sight glass, if desired, may also be attached to the elbow extension 22 of FIG. 1.

The port 116 includes an annular sleeve 120 attached to the elbow extension by screws 122 and which mates with a standard pressure fueling nozzle, and a spider 124 having ports 126 supports the poppet valve 128 and compression spring 130 biases the poppet valve to a closed sealed relationship with the sleeve valve seat 132. The valve 128 prevents the loss of fluid when the nozzle is disconnected.

The port 116 is further protected by the removable cap 134 which is operated by the manually operated handle 136. The cap includes an inner portion 138 supporting retaining contractable wire 140 located in recess 142, and upon exerting an outward pull on the handle 136 the inner portion 138 moves to the left to contract wire 140 over the outer portion ridge 144 to align the recess 146 with the balls 148 permitting release of the outer portion 150 from the recess 152 whereby the entire cap may be removed from port 116. Reinstalling the cap reverses the aforedescribed sequence.

Flow through the port 116 is controlled by the valve 154 adapted to seat against the spider surface 156. The valve 154 is controlled by a differential pressure actuator which includes chamber 158 mounted on the elbow extension, the left side of which includes the flexible diaphragm 160 supporting the valve. Compression spring 162 endeavors to bias the valve toward the left into a closed condition wherein the valve 154 engages the surface 156.

The upper portion of the extension 114 includes a chamber 164 receiving a float 166 which controls valve 168 located at the upper end of the vent passage 170. Additionally, the chamber 164 is vented to the atmosphere by vent check valve 172 which includes a small float whereby air may be exhausted through the vent, but the float prevents liquid from flowing therethrough.

The vent passage 170 communicates through the passages 173 and 175, FIG. 9, with the interior of the expansible chamber 158 whereby the chamber will be in communication with the chamber 164 except when the tank is full.

In operation, the filling port 116 is rendered accessible by lifting and pulling on the handle 136 to remove the cap 134 therefrom. Thereupon, the nozzle of the filling hose is inserted into the port 116 which displaces the poppet 128 to the right. Upon the commencement of the flow fuel flowing through the port 126 will bias the valve 154 to the right, and from the surface 156. In this manner fuel will flow into the elbow extension 114 and the associated fuel tank.

As the tank is filled, air within the extension 114 is vented through the vent valve 172. At the final stages of filling the fuel will enter the chamber 164, raise float 166 and close valve 168. Thereupon, the differential expansible chamber 158 is no longer being vented to chamber 164 and the small bleed orifice 174 located within the rivet 176 permits the interior of the chamber 158 to fill with fluid under the pressure existing at the valve 154. As the pressure within the chamber 158 equalizes to the fluid pressure acting on on valve 154 the area of the diaphragm 160 is sufficient to force the valve 154 to the left closing the valve and terminating flow into the fitting and tank. The operator then removes the nozzle from the filling port and replaces the cap 134.

As will be appreciated, the aforedescribed embodiment of a frangible fitting permits both gravity and pressure refueling and while pressure refueling is most desirable, smaller facilities having only gravity refueling are still capable of servicing the aircraft.

Various modifications to the inventive concepts may be apparent to those skilled in the art without departing from the spirit and scope of the invention.

We claim:

1. A self-contained tank filling fitting for use with gravity and pressurized fluid supply systems for filling a tank having a side wall, an upper wall and a port defined in the side wall below the upper wall comprising, in combination, an annular port plate mounted within the tank port having a passage and an annular attachment surface dircumscribing said passage, a filling extension of an elbow configuration including an upwardly extending portion having an upper filling end adapted to be closed by a removable cap for gravity filling, an attachment portion having an axis transverse to said upwardly extending portion and an intermediate elbow portion, an annular attachment surface defined on said attachment portion sealingly engaging said port plate attachment surface, fasteners attaching said extension upon said port plate, a pressurized filling port defined in said extension intermediate elbow portion and in axial alignment with said attachment portion for receiving a pressurized fluid fitting, a flow control valve within said filling port operable between open and closed positions, a differential pressure operated actuator operatively connected to said flow control valve, an extension chamber defined in said extension adjacent said upper filling end, an atmosphere vent defined in said extension upper filling and establishing communications between said chamber and the atmosphere, a vent valve within said extension chamber in communication with said chamber and said actuator positionable between actuator venting and non-venting positions, a float within said chamber operatively connected to said vent valve within said extension chamber and adjacent said filling end, and a bleed orifice establishing communication between the tank and said actuator whereby fluid flowing within said filling port maintains said flow control valve in its open position and closing of said vent valve to its non-venting position by said float causes said actuator to move said flow control valve to its closed position whereby the tank can be filled by gravity through said upper filling end and by pressure through said pressurized filling port.

2. In a tank filling fitting as in claim 1, said actuator comprising an expansable chamber communicating with said vent valve and orifice and a diaphragm defining a portion of said chamber, said diaphragm supporting said flow control valve.

3. In a tank filling fitting as in claim 1, said filling port including a spring biased self-sealing protective valve openable by a fluid supply filling attached to said filling port, and a removable protective cap defined on said extension within said filling port.

* * * * *